UNITED STATES PATENT OFFICE 2,061,332

PROCESS FOR PRODUCTION OF CALCIUM HYPOCHLORITE BLEACH LIQUOR SUITABLE FOR BLEACHING OF PAPER PULP

John D. Rue, Niagara Falls, N. Y., assignor to Hooker Electrochemical Company, New York, N. Y., a corporation of New York No Drawing. Application August 27, 1935, Serial No. 38,084

8 Claims. (Cl. 23—86)

My invention relates to a process for production of bleach liquor by chlorination of milk of lime and has for one of its objects to reduce the time, as well as the cost of equipment and building space, necessary therefor. Another object of my invention is to effect economies in the reagents used in the production of bleach liquor. Still another object of my invention is to produce bleach liquor by the use of which improvement may be effected in the quality of bleached paper pulp obtainable by known methods of bleaching with calcium hypochlorite.

In the preparation of calcium hypochlorite bleach liquor, milk of lime is chlorinated, in accordance with the following reaction:

$$2Ca(OH)_2 + 2Cl_2 = Ca(OCl)_2 + CaCl_2 + 2H_2O$$

The calcium hydroxide of this equation is, of course, derived from the hydration of calcium oxide, which in turn is produced by the roasting of naturally occurring calcium carbonate. The latter is never found in a pure state, but contains foreign matter, some of which is of a siliceous nature, such as sand, and highly insoluble. The calcium hydroxide itself is of low solubility and as milk of lime is largely in a state of suspension. In addition to the insoluble matter above mentioned, there is always present a certain proportion of insoluble carbonates, some of which may be a residue of the original calcium carbonate. Additional calcium carbonate may be formed during the hydration of the lime by absorption of $CO_2$ from the atmosphere.

After chlorination of milk of lime, for reasons that will be given later, it is customary to add lime in order to ensure an excess of $Ca(OH)_2$. This may amount to 2 grams per liter. The pH of the bleach liquor may therefore be 8 to 12. The insoluble matter above mentioned, as well as any excess calcium hydroxide, remain as undissolved solids, which may be removed from the hypochlorite solution or bleach liquor by settling and decanting. Unless this matter is removed from the bleach liquor before it is used in the paper pulp processes some of it will appear in the finished paper as specks, discolorations and rough spots. The practice of allowing the sludge to settle and decanting off the clear liquor has therefore become universal in the paper industry. This of course involves the waste of any excess $Ca(OH)_2$ that may be present.

The settling of the sludge and decanting off of the liquor is an operation usually requiring a period of approximately 5 to 12 hours. During this time more $CO_2$ is being absorbed from the atmosphere. This reacts with the calcium hydroxide to form calcium carbonate, thus reducing the alkalinity of the bleach liquor. This settling process, moreover, necessitates the installation of large tankage capacity and involves additional supervision, thus adding appreciably to the cost of the bleaching operation.

In the bleaching of paper pulp, oxygen is caused to react with the lignin and carbohydrate constituents of the pulp, producing among other products carbon dioxide and water. This carbon dioxide, as above stated, will react with any free calcium hydroxide to produce calcium carbonate. On account of the low solubility of calcium hydroxide, settled and decanted calcium hypochlorite solutions do not contain sufficient free calcium hydroxide to combine with all the carbon dioxide formed during the bleaching. If there is no excess alkalinity present, the carbon dioxide will react with the calcium hypochlorite to produce calcium carbonate and hypochlorous acid. The hypochlorous acid, although a bleaching agent, is objectionable, as it has a tendency to oxidize and destroy some of the cellulose and thus reduce yield and weaken the pulp. Any free gaseous carbon dioxide remaining will become entangled with the pulp, resulting in a troublesome swelling and frothing of the pulp mass. To protect the hypochlorite against the carbon dioxide and avoid frothing, it is customary to add caustic alkali to the bleach liquor after it has been decanted from its sludge. If lime were used for this purpose it would introduce more of the objectionable solids above referred to. Hence it is customary to use caustic soda for this purpose. This caustic soda reacts with the $CO_2$, forming $Na_2CO_3$ and, having a greater affinity for $CO_2$ than that of the hypochlorite, prevents the formation of hypochlorous acid.

I have discovered that if the milk of lime be passed through a screen of fine mesh and the coarse solids thus removed before chlorination, the bleach liquor produced therefrom may be used in freshly chlorinated unsettled condition. The settling and decanting of the bleach liquor thus produced may therefore be dispensed with and the expense of tankage and supervision thereby reduced. Moreover, the deterioration of the bleach liquor incident to prolonged settling is thereby avoided. Alkalinity may then be ensured by stopping short of complete chlorination or by the addition of more unchlorinated screened milk of lime, without introducing any objectionable solids. The use of the relatively expensive caustic soda is thus avoided.

In the bleaching of paper pulp with hypochlorites it is known that the direction and extent of the reaction with the chlorine is markedly influenced by the hydrogen ion concentration, i. e., the pH of the hypochlorite solution. At a pH of over 10 or 12 the reaction is strongly toward oxidation and destruction of the coloring matter in the pulp. At the same time the degradation of cellulose proceeds very slowly. At a pH below 3 or 4 the reaction is strongly toward direct chlorination and only to a limited extent toward oxidation and destruction of the coloring matter. At a pH of about 7 the degradation of the cellulose proceeds most rapidly. A hypochlorite will therefore be most efficient as a bleaching agent at a pH greater than 8 and a very marked reduction in the strength of the pulp will result at a pH of about 7. In practice it is therefore desirable to maintain a substantial excess of alkalinity, so that at the end of the bleaching operation the pH of the solution will not fall substantially below 8. In my process, this excess alkalinity is supplied by adding screened milk of lime instead of caustic soda, the bleach liquor being of course agitated before using. The alkalinity is therefore not limited by the solubility of the lime. Lime being cheaper than caustic soda, a greater alkalinity can thus be maintained at no greater cost for reagents, and, as will be shown later, with an improvement in the product.

It was formerly customary to bleach paper pulp in one hypochlorite bleaching stage. This practice has now given way to processes involving two or more stages. The first stage in modern practice usually consists in a direct chlorination of the pulp. This chlorinates the lignin and renders it soluble in alkaline solutions. A large proportion of the lignin may then be removed before the actual bleaching stage. The latter stage is thereby shortened and the degradation of the pulp during the bleaching operation thus reduced. In any case, the final stage is usually a hypochlorite bleaching operation. My process is applicable to the hypochlorite bleaching stage of modern multiple stage processes, as well as to the older single stage process.

For the purpose of my process, I make up the milk of lime by adding from ¼ to ¾ lb. of calcium oxide to each gallon of water. The resulting milk of lime contains approximately 3.8 to 10.9 percent calcium hydroxide. After screening, and before chlorination, the milk of lime is diluted, if necessary, to bring it to the lower of the above limits, namely approximately 3.8 percent $Ca(OH)_2$, corresponding to about ¼ lb. CaO per gallon of water.

For the screening of the milk of lime in accordance with my process, I have found that screens of the fineness of 100 to 200 wires per inch are most suitable. If the mesh be between these limits the milk of lime will flow rapidly through the screen under a very slight head. Below 100 mesh, screens through which milk of lime will readily flow are found to permit the passage of objectionable particles of foreign matter. Therefore 200 and 100 wires per inch are found to be the practical upper and lower limits of fineness respectively of screens for use in connection with my process. The fineness to be preferred in my process is 170 wires per inch. Until these facts were established the process was regarded as too troublesome for commercial adoption; but if the screen employed be of the fineness indicated the screening of the milk of lime presents no practical difficulty.

My process therefore affords a great simplification as compared with that of the prior art and at the same time substantial economies in equipment and consumption of chemical reagents, besides yielding an improved product.

The following may be regarded as a typical illustration of the improvement in strength and color characteristics obtainable in paper pulp by the use of my bleach liquor:

A quantity of spruce sulphite pulp that had been treated in accordance with good modern practice, including a preliminary chlorination step, was divided into two parts. One part was further treated with the settled hypochlorite bleach liquor of the prior art. Another part was treated by the unsettled bleach liquor of my present invention. The results were as follows:

|  | Present invention | Prior art |
|---|---|---|
| Available chlorine consumed, percent | 0.7 | 1.0 |
| pH at end of bleaching operation | Above 8.5 | Below 7 |
| Color | 86 | 84 |
| Alpha cellulose, percent | 88.6 | 85.9 |
| Alkali insoluble, percent | 81.6 | 73.5 |
| Copper number | 2.0 | 3.0 |
| Mullen test, points per pound per ream | 88 | 80 |
| Tear test, grams per pound per ream | 120 | 101 |
| Double folds | 2,700 | 1,700 |

It will be observed that the portion treated with my bleach liquor showed not only a whiter color but also a higher alpha cellulose content, lower copper number and higher strength under the Mullen, tear and fold test.

What I claim is:

1. The process for production, by chlorination of milk of lime, of calcium hypochlorite bleach liquor suitable, in unclarified condition, for bleaching of paper pulp which comprises passing the unchlorinated milk of lime through a screen of the fineness of approximately 100 to 200 wires per inch, whereby the particles of matter normally found therein which cannot be tolerated in paper are removed, and chlorinating the screened milk of lime thus prepared to a pH of 8 or higher.

2. The process for production, by chlorination of milk of lime, of calcium hypochlorite bleach liquor suitable, in unclarified condition, for bleaching of paper pulp which comprises passing the unchlorinated milk of lime through a screen of the fineness of approximately 170 wires per inch, whereby the particles of matter normally found therein which cannot be tolerated in paper are removed, and chlorinating the screened milk of lime thus prepared to a pH of 8 or higher.

3. The process for production, by chlorination of milk of lime, of calcium hypochlorite bleach liquor suitable, in unclarified condition, for bleaching of paper pulp which comprises passing the unchlorinated milk of lime through a screen of the fineness of approximately 100 to 200 wires per inch, whereby the particles of matter normally found therein which cannot be tolerated in paper are removed, and chlorinating the screened milk of lime thus prepared to a point substantially short of complete chlorination of the lime contained therein.

4. The process for production, by chlorination of milk of lime, of calcium hypochlorite bleach liquor suitable, in unclarified condition, for bleaching of paper pulp which comprises passing the unchlorinated milk of lime through a screen of the fineness of approximately 100 to 200 wires per inch, whereby the particles of matter normally found therein which cannot be tolerated in paper are removed, chlorinating the screened milk of lime thus prepared until substantially all the lime thereof is converted to calcium chloride and calcium hypochlorite and then adding additional unchlorinated screened milk of lime in amount sufficient to ensure a substantial excess thereof.

5. The process for production, by chlorination of milk of lime, of calcium hypochlorite bleach liquor suitable, in unclarified condition, for bleaching of paper pulp which comprises passing the unchlorinated milk of lime through a screen of the fineness of approximately 100 to 200 wires per inch, whereby the particles of matter normally found therein which cannot be tolerated in paper are removed, chlorinating the screened milk of lime thus prepared until substantially all the lime thereof is converted to calcium chloride and calcium hypochlorite and then adding additional unchlorinated screened milk of lime in amount sufficient to ensure a pH greater than 8.

6. The process for production, by chlorination of milk of lime, of calcium hypochlorite bleach liquor suitable in unclarified condition for bleaching of paper pulp, which comprises first passing the unchlorinated milk of lime through a screen which will permit the passage only of particles of matter too small to be objectionable in the paper and then chlorinating the milk of lime thus prepared to a pH of 8 or higher.

7. The process for production, by chlorination of milk of lime, of calcium hypochlorite bleach liquor suitable in unclarified condition for bleaching of paper pulp, which comprises first passing the unchlorinated milk of lime through a screen which will permit the passage only of particles of matter too small to be objectionable in the paper, then chlorinating the milk of lime thus prepared until substantially all the lime thereof is converted to calcium chloride and calcium hypochlorite and then adding more unchlorinated screened milk of lime in amount sufficient to insure a substantial excess thereof.

8. The process for production, by chlorination of milk of lime, of calcium hypochlorite bleach liquor suitable in unclarified condition for bleaching of paper pulp, which comprises first passing the unchlorinated milk of lime through a screen which will permit the passage only of particles of matter too small to be objectionable in the paper, then chlorinating the milk of lime thus prepared until substantially all the lime thereof is converted to calcium chloride and calcium hypochlorite and then adding more unchlorinated screened milk of lime in amount sufficient to insure a pH greater than 8.

JOHN D. RUE.